April 26, 1966  HANNS-H. KROEGER ETAL  3,248,214
METHOD OF PRODUCING CATALYTIC ELECTRODES
Filed Nov. 1, 1961

INVENTORS:
HANNS-H. KROEGER
AND KLAUS DEHMELT
BY
AGENT

United States Patent Office 3,248,214
Patented Apr. 26, 1966

3,248,214
METHOD OF PRODUCING CATALYTIC ELECTRODES
Hanns-H. Kroeger, Hamburg, and Klaus Dehmelt, Frankfurt am Main, Germany, assignors to Varta Aktiengesellschaft, Hagen, Westphalia, Germany, a corporation of Germany
Filed Nov. 1, 1961, Ser. No. 149,309
Claims priority, application Germany, Nov. 9, 1960, A 35,977
9 Claims. (Cl. 75—208)

The present invention relates to an improved method of producing catalytic electrodes, such as are used, for instance, in galvanic elements and, more particularly, in fuel cells, and to such electrodes.

All known production methods for such catalytic electrodes have the common disadvantage that they require a considerable number of steps, some of which must be separated by varying intervals of time. In one known method, for instance, a porous body is sintered from a metallic powder and, after the sintered body has been cooled, it is impregnated with a solution of a salt of a catalytically active metal. After impregnation, the catalytically active metal or its oxide is chemically or electrochemically precipitated. Finally, undesirable impurities and ions must be washed out of the catalytically activated body.

In another known method, a Raney nickel catalyst, for instance, is sintered together with the electrode body but the subsequent activation of the catalyst requires a considerable number of steps, i.e. repeated treatment of the sintered body with concentrated alkali metal hydroxide solution to dissolve and remove the catalytically inactive metal, for instance, aluminum.

It is the promary object of the present invention to provide a particularly economical method of producing catalytic electrodes, which method requires a minimum of production steps.

It is another object of this invention to provide such a method wherein any type of useful catalytic substance may be used, regardless of its thermic and mechanical properties.

The above and other objects and advantages are attained in accordance with the invention by placing a metallic powder capable of being sintered into a mold and premolding it into a cup-shaped body having an open recess. The recess is then filled with any desired catalytic substance, which may be in particulate form, for instance, in powder form or which may have been pre-shaped into a body conforming to the recess. After the recess has been filled with the catalytic substance, the recessed cup-shaped body is covered with a layer of a metallic powder capable of being sintererd. The metallic powders of the cup-shaped body, the catalytic material, and the covering layer are pressed together in the mold and the metallic powders are sintered together, preferably in the mold to form the catalytic electrode.

If the catalytic substance is poured into the pre-molded cup-shaped body in particulate powder form care, should be taken to prevent its particles from covering the rim of the cup-shaped body so that the covering layer may contact this rim directly and proper sintering together of cover and body may be assured in all instances.

It may be preferred, under certain circumstances, to compact the catalytic substance into a shaped body and to insert this body into the recess.

The porosity of the electrode and/or the catalyst may be increased by adding to the metallic powder and/or the catalytic substance a material which decomposes at the sintering temperatures, such as ammonium carbonate, ammonium chloride, hydrazine-derivates, for instance phenyl-hydrazine, sodium azide ($NaN_3$) and urea or other compounds which decompose at the temperature of sintering without leaving any residues.

The mechanical connection of the catalytic substance to the sintered electrode body will be improved in such cases where the catalytic substance cannot be sintered if a metallic powder which may be sintered is added to the catalytic substance.

Relatively low pressure may be used if sintering is effected in the same mold wherein the sintered body is compressed and while the metallic powders are pressed together.

The above and other features of the present invention will be more readily understood by reference to the following detailed description of certain preferred embodiments thereof, taken in conjunction with the accompanying drawing wherein—

Figure 1:
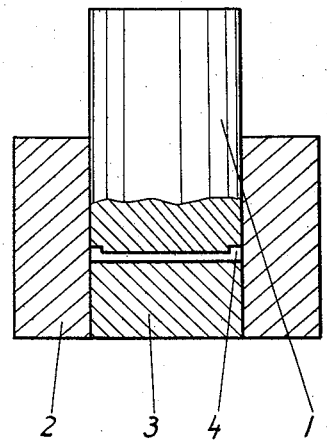
FIG. 1 is a vertical section through a mold showing the first production step.

Referring now to the drawing, wherein like reference numerals refer to like parts in all figures, mold parts 2, 3 are shown in FIG. 1 to form the female mold portion with which the pressure-actuated male mold part 1 cooperates in pre-molding the cup-shaped body 4 of metallic powder. As shown, this cup-shaped body is formed with a central recess surrounded by an annular rim corresponding to a like annular recess in mold part 1.

Figure 2:
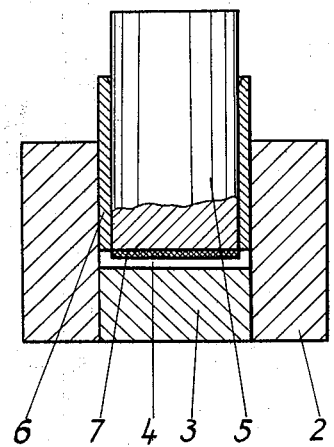
FIGS. 2 to 4 are similar views showing subsequent production steps.

FIG. 2 illustrates one preferred method wherein the catalytic substance is poured into the recess of the pre-molded cup-shaped body in particulate form. This may readily be accomplished by placing upon the rim of the cup-shaped body a tube 6 whose wall thickness is exactly the same as the diameter of the rim. In this manner, the rim will be masked when particulate catalytic material 7 is poured into the recess through tube 6, thus keeping the material off the rim and making certain that it will not interfere during the subsequent sintering procedure to be explained more fully in connection with FIG. 4.

After the recess of cup-shaped body 4 has been filled with the particulate catalytic substance 7, a pressure- actuated mold part 5, which fits exactly into tube 6, compacts the catalytic substance sufficiently so that its surface is at least flush with the rim of the cup-shaped body.

Figure 3:
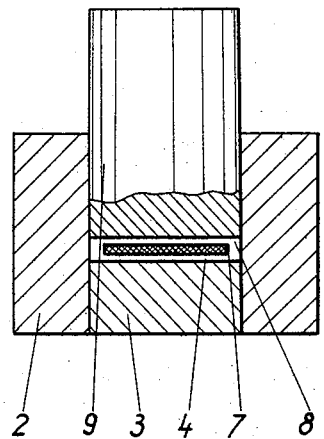

FIG. 3 illustrates how a covering layer 8 of a metallic powder which may be sintered, preferably the same powder used for the cup-shaped body 4, is placed over the cup-shaped body and its recess filled with catalyst 7, pressure-actuated male mold part 9 being used to press the metallic powders of layer 8 and cup-shaped body 4 together and to unite them into an integral electrode body.

Figure 4:
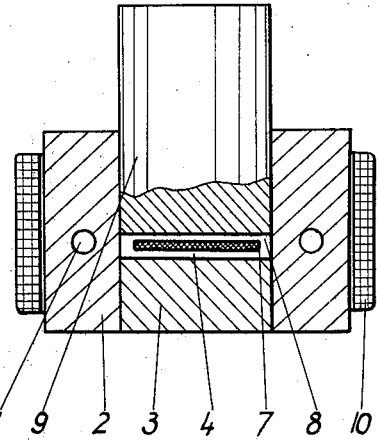

FIG. 4 schematically illustrates how the final step of compression and molding of the electrode body may be effected in the presence of heat to sinter the metallic powder. As shown, the female mold part 2 is surrounded by heating means 10, for instance an electrical heating device, to raise the temperature sufficiently to effect sintering while the metal powder is compressed. Channels 11 are provided in mold part 2 so that a cooling fluid, such as water, may be used to cool the mold rapidly after sintering has been completed.

The pressure for pre-molding the cup-shaped body 4 may vary widely, for instance, between about 10 kg./sq. cm. and about 100 kg./sq. cm., the amount of pressure depending only on that necessary for shaping the body and being preferably low enough to maintain a certain roughness of the surface of the rim of the body to which the covering layer is to be sintered subsequently. This pre-molding as well as the final molding pressure will vary with the ductility of the metallic powder used for making the electrode body and will accordingly increase, in the indicated order, from silver, to carbonyl nickel "A," carbonyl nickel "B," cobalt, iron, silver-nickel alloys, cobalt-iron alloys, V2A-steel and still harder metals.

Carbonyl nickel is a pulverulent metallic nickel obtained by the decomposition of the gaseous compound $Ni(CO)_4$, the nickel particles having a diameter of about $5\mu$. The particles of carbonyl nickel "A" are primarily spherical while the "B" form is dendritic.

The final molding pressures, under which the cup-shaped body and the covering layer are united to form the electrode, may vary between about 680 kg./sq. cm. and about 1450 kg./sq. cm., depending on the ductility of the metallic powder. For instance, this pressure will increase from about 680 kg./sq. cm. for silver to 825–850 kg./sq. cm. for carbonyl nickel "A," 1040–1090 kg./sq. cm. for carbonyl nickel "B," 1180–1300 kg./sq. cm. for cobalt, about 1320 kg./sq. cm. for iron and about 1400–1450 kg./sq. cm. for silver-nickel and cobalt-iron alloys as well as V2A-steel.

The above substances illustrate metallic powders which are capable of being sintered and which make useful electrode bodies. They are heavy metals and alloys of such metals, particularly silver and metals of the iron group.

A wide variety of catalytic substances may be used in the practice of this invention, depending entirely on the catalytic effect desired in the finished electrode and it is a particular advantage of the invention that the catalytic substance may be selected regardless of the ability of the substance to form a mechanically stable body. Since the catalytic substance is held in the recess of the cup-shaped electrode body and then covered completely so that a mechanically resistant sintered wall surrounds the catalytic substance completely in the finished electrode, the mechanical stability of the catalytic substance, or its lack thereof, makes no difference.

By way of example, but by no means limited thereto, the following catalysts may be useful in the practice of this invention:

(a) A mixture of the hydroxides of trivalent cerium, $Ce(OH)_3$, and divalent nickel, $Ni(OH)_2$;

(b) Silver permanganate, $AgMnO_4$;

(c) The decomposition product of moistened silver permanganate, the water content thereof having been removed in a drying chamber. While the exact chemical composition of this product is difficult to determine, the valence of its Mn atoms is above 4+;

(d) Manganese dioxide which has been electrolytically produced at room temperature, washed with an acid, and subsequently dried in a drying chamber;

(e) Manganese dioxide which has been electrolytically produced and first washed with alcohol and then with acetone;

(f) Manganite, $MnO(OH)$;

(g) Silver, platinum, and palladium sponge;

(h) Niobium, tantalum, titanium, zirconium, and uranium powder;

(i) Niobium or tantalum powder in intimate mixture with carbonyl nickel "A";

(j) Activated carbon impregnated with silver nitrate;

(k) Cobalt-chromium spinel powder;

(l) Raney metals, particularly Raney silver;

(m) Green nickel oxide, NiO;

(n) A mixture of nickel and beryllium hydroxides; and (o) Cerous hydroxides, $Ce(OH)_3$; and others.

If the electrode is to be used as a hydrogen electrode in a fuel cell, it may be advantageous to subject oxides or hydroxides, if such are used as catalysts to preliminary reduction. This may readily be accomplished by sintering the catalyst body at elevated temperature in a hydrogen atmosphere. If nickel salts or a salt mixture including nickel salts are used, it is preferred to effect sintering in a nitrogen atmosphere. If Raney nickel is used, it may be sintered at the same time as the surrounding electrode body, i.e. by subjecting the body to a temperature of 410–420° C. at a pressure of 510–525 kg./sq. cm. for about 9 minutes.

Such catalytic substances as niobium, tantalum, titanium and cobalt-chromium spinel powder cannot be sintered at all under the operating conditions. Therefore, if desired, carbonyl nickel may be added thereto for this purpose or, in the case of cobalt-chromium spinel powder, an addition of cobalt powder may be preferred.

Generally speaking, it is possible to add the metallic powder used for the electrode body to the catalytic substance to improve its mechanical strength but it is the particular advantage of the present invention to make this unnecessary since the catalyst need not be sintered at all.

Figure 5:
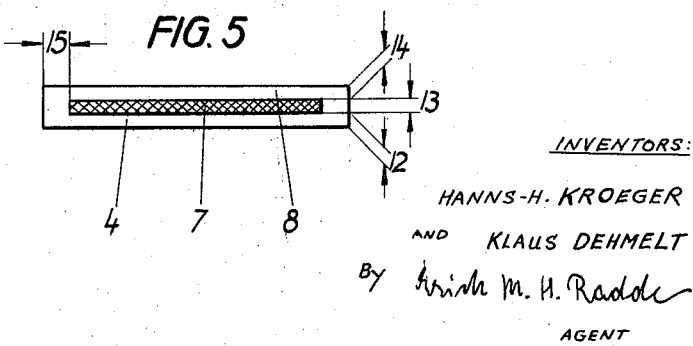
FIG. 5 is a cross section of a finished catalytic electrode produced according to the invention.

A finished electrode body according to the present invention is shown in FIG. 5. Such catalytic electrodes are particularly useful in smaller apparatus and optimum dimensions are obtained if the diameter of the electrode does not exceed about 18 cm., and is preferably about 10 cm. If the electrode diameter is larger, its mechanical stability should be increased, for instance, by providing a perforated metal sheet or like insert, or by supporting the electrode body in a suitable manner. The optimum thickness of the electrode body is about 3 mm.

It has been found that the optimum range of the thickness 13 of the catalytic substance lies between about $50\mu$ and about $1000\mu$. If the electrode diameter is about 7 cm. to 8 cm., the optimum thickness of the electrode end walls, shown at 12 and 14, is about $500\mu$, thickness 13 then being about $350\mu$. Obviously, the thickness of the catalytic substance layer depends primarily on the degree of activity of the substance. The thickness of the electrode end walls will depend primarily on the purely mechanical requirements of the finished electrode and on the degree of porosity of the walls. Obviously, the catalyst can become effective only if it is accessible through the walls of the electrode body and the permissible thickness of the electrode body walls increases with their porosity.

The thickness 15 of the side wall of the electrode body will be about the sum of the thicknesses 12 and 14. It is advantageous to make the side wall so thick that the catalytic substance 7 is not, or hardly, accessible therethrough. If the electrode body is to be mounted in a tubular reaction vessel, the thickness 15 may be chosen large enough to enable the electrode body to be mounted around its edge in the tube, thus removing part of the annular end zone of the electrode body from the reaction vessel.

The following examples for producing an electrode with a—

| | Mm. |
|---|---|
| Diameter of the electrode body | 74.0 |
| Thickness of the electrode side walls | 2.4 |
| Thickness of the electrode end walls | 1.3 |
| Thickness of the catalytic substance | 0.6 | will illustrate the practice of the present invention without in any way limiting the same thereto:

*Example 1*

Carbonyl nickel "A" powder is placed into the mold 2, 3 and compacted by male mold part 1 under a pressure of 10 kg./sq. cm. to form a cup-shaped porous body. After mold part 1 is removed, a stoichiometric pulverulent mixture of cobalt oxide and chromium oxide is poured into the recess of the cup-shaped body, as shown in FIG. 2, the tube 6 is removed, and a layer of the same carbonyl nickel "A" powder is placed over the cup-shaped body, whereupon the covering layer is pressed against the cup-shaped body by mold part 9 for one minute under a pressure of 800–1000 kg./sq. cm. This pressure suffices to make it possible to remove the compacted body from the mold without damage and to place it into a sintering furnace where it is sintered in a hydrogen protective atmosphere at a temperature of 950° C. for three minutes.

*Example 2*

The procedure of Example 1 is repeated but silver powder is used instead of carbonyl nickel "A" and the catalytic substance is mixture of cerous oxide $Ce(OH)_3$ and nickelous oxide $Ni(OH)_2$. The final molding pressure is 680 kg./sq. cm. for 2 minutes and sintering is effected in a protective nitrogen atmosphere for 3 minutes at a temperature of 620° C.

*Example 3*

The procedure of Example 1 is repeated but carbonyl nickel "B" is used, the final molding pressure being increased to 1050 kg./sq. cm. The catalytic substance is silver permanganate. All other conditions remain unchanged.

*Example 4*

Example 1 is repeated, substituting cobalt powder for the electrode body and manganite for the catalytic substance. All conditions remain unchanged, except that the final molding is effected at a pressure of 1250 kg./sq. cm. for one minute and sintering in the mold is effected at a temperature of 850° C. for 5 minutes.

*Example 5*

Example 1 is repeated, with iron powder for the electrode body and electrolytically produced manganese dioxide as the catalyst. The final molding pressure is increased to 1320 kg./sq. cm. for 2 minutes and sintering takes place at a temperature of 950° for one minute.

*Example 6*

Example 1 is repeated, with a silver-nickel alloy containing 30% of silver and 70% of nickel for the electrode body and a dried decomposition product of moistened silver permanganate as the catalyst. The final molding takes place at a pressure of 1400 kg./sq. cm. for 2 minutes and sintering at a temperature of 800° for 3 minutes.

*Example 7*

Example 1 is repeated, with a cobalt-iron alloy containing 60% of cobalt and 40% of iron for the electrode body and niobium, tantalum, titanium, zirconium, or uranium powder as the catalyst. Final molding is effected at a pressure of 1450 kg./sq. cm. for one minute and sintering takes place in a protective argon atmosphere at a temperature of 1000° for 2 minutes.

*Example 8*

Example 1 is repeated but V2A-steel is used for the electrode body and a mixture of cobalt-chromium spinel powder and cobalt powder is used for the catalyst. The final molding pressure is 1450 kg./sq. cm. for one minute and sintering in the mold by electrical heating takes place at a temperature of 1030° for 2 minutes.

*Example 9*

Example 3 is repeated but the catalyst is a tablet of activated carbon impregnated with an aqueous solution of silver nitrate to increase its catalytic activity. The final molding pressure is increased to 1500 kg./sq. cm. The compacted electrode body is sintered for 10 minutes at 650° C. in an ammonia atmosphere. The resultant electrode body has a porosity of 60% but is nevertheless so strong that it cannot be broken manually.

*Example 10*

Example 1 is repeated but the catalyst is a tablet consisting, by weight, of 95% of carbonyl nickel "A" and 5% of palladium sponge. Silver or platinum sponge may be substituted. Sintering of the molded electrode body is effected in a nitrogen atmosphere at 800° C. for five minutes.

*Example 11*

Example 10 is repeated but 20%, by weight of ammonium carbonate is admixed to the carbonyl nickel powder forming the covering layer. This causes the sintered top wall of the electrode body to have a porosity of 80% while the side walls and the bottom wall have a porosity of only 62%.

*Example 12*

Example 1 is repeated but the catalyst is a tablet consisting of an intimate mixture, by weight, of 60% of silver permanganate, 20% of $MnO_2$ and 20% of cerous hydroxide. The thickness of the tablet is only two thirds of the depth of the recess of the cup-shaped body of the electrode. The molded electrode body is sintered in an ammonia atmosphere at 600° C. for 10 minutes. When this electrode is fractured to expone its interior catalytic layer, it is shown that the recess is filled out completely by a loose mixture of silver, manganese dioxide, and cerous oxide.

It is obvious from the above examples that the metallic powders for the electrode body and the catalytic substances may be varied and combined in numerous ways, depending on the desired usage of the electrode and catalytic activity, the only requirement being that the metallic powder is capable of being sintered so as to form a mechanically stable electrode body. It is the particular advantage of the invention that there are no thermic or mechanical requirements for the catalytic substance so that it is possible to use such substances which cannot be sintered to form a sintered body with the electrode-forming metallic powders and/or which cannot readily be dissolved so that it is not possible to impregnate a porous electrode body with the catalytic solution to form a catalytically active electrode.

While various embodiments of the invention have been described and exemplified hereinabove, it will be clearly understood that many modifications and variations may occur to the skilled in the art without departing from the spirit and scope of this invention as defined in the appended claims.

We claim:

1. A method of producing a catalytic electrode comprising a sintered electrode body and a catalytic substance, comprising the steps of molding a sinterable metallic powder into a cup-shaped body having an open recess, filling the recess with the catalytic substance, covering said cup-shaped body and recess with a layer of a sinterable metallic powder, pressing the metallic powders of the cup-shaped body and the covering layer together, and sintering the metallic powders whereby said cup-shaped body and said layer form the sintered electrode body.

2. The method of claim 1, wherein the catalytic substance is in particulate form and is poured into the recess.

3. The method of claim 1, wherein the catalytic substance is a shaped body substantially conforming to the recess and said shaped body is placed into the recess.

4. The method of claim 1, further comprising the step of adding a material to the catalytic substance, which decomposes during the sintering so as to increase the porosity of the catalytic substance.

5. The method of claim 1, further comprising the step of adding a sinterable material to the catalytic substance.

6. The method of claim 1, wherein sintering is effected while the metallic powders are pressed together.

7. The method of claim 1, further comprising the step of adding a material to the metallic powder, which decomposes during the sintering thereof so as to increase the porosity of the electrode.

8. The method of claim 1, wherein the metallic powder is selected from the group consisting of silver, nickel, cobalt, iron, alloys of silver and nickel, alloys of cobalt and iron, and steel.

9. The method of claim 8, wherein the metallic powders are pressed together at a pressure between about 680 kg./sq. cm. and about 1450 kg./sq. cm., the pressure increasing with the ductility of the metallic powders.

References Cited by the Examiner

UNITED STATES PATENTS

| | | | |
|---|---|---|---|
| 2,928,891 | 3/1960 | Justi et al. | 136—120 |
| 3,035,998 | 5/1962 | Sommer et al. | 204—284 |
| 3,068,311 | 12/1962 | Chambers et al. | 136—120 |

FOREIGN PATENTS 232,935  1/1959  Australia.

WINSTON A. DOUGLAS, *Primary Examiner.*

JOHN H. MACK, *Examiner.*